United States Patent Office 3,252,897
Patented May 24, 1966

3,252,897
PROCESS FOR PURIFYING WEAK ELECTROLYTES
AND NONELECTROLYTES
James C. Hesler, Clarendon Hills, and Kenneth A.
Schmidt, Oak Lawn, Ill., assignors to Nalco Chemical
Company, Chicago, Ill., a corporation of Delaware
No Drawing. Filed May 25, 1962, Ser. No. 197,619
15 Claims. (Cl. 210—24)

In a copending and now abandoned application Serial No. 164,380, which was filed on January 4, 1962, a process was disclosed which was directed to the purification of weak acids of organic or inorganic nature in aqueous or semiaqueous solution. The present application is a continuation-in-part of application Serial No. 164,380.

This invention relates to the purification of weak electrolytes such as weak acids of organic or inorganic nature, and to the purification of nonelectrolytes in aqueous or semiaqueous solution. The invention is also directed to a process for regenerating an ion exchange bed used in the purification process.

The principal object of this invention is to provide a new and improved procedure for the purification of weak electorlytes and nonelectrolytes by means of an ion exchange system.

Another object of the invention is to provide a new and improved procedure for the purification of weak acids obtained from natural, or synethesized, products by fermentation, destructive distillation, or other means, or discharged as by-products from process operations.

Another object of this invention is an economical procedure for purifying aqueous or semiaqueous solutions of weak acids at concentrations in the range of 1–95%, which contain strong acids, salts of such acids, or mixtures thereof, as impurities.

A further object of this invention is a process for selectively removing strong acids from aqueous, or semiaqueous solutions of weak acids.

An additional object of this invention is a procedure for selectively removing salts of strong acids, or mixtures of such salts and acids, from aqueous or semiaqueous solutions of weak acids.

Still another object of the invention is to provide a process for demineralizing aqueous solutions.

Another object of the invention is to provide a process for selectively removing salts of strong acids or mixtures of such salts and acids from aqueous or semiaqueous solutions of nonelectrolytes.

Still another object of the invention is to provide an improved process for regenerating ion exchange resin mixtures composed of a cation exchange resin and an anion exchange resin.

Another object of the invention is to provide an improved process for regenerating an ion exchange system consisting of a cation resin bed followed by a separate anion resin bed.

Other objects of this invention will become apparent from the following description of the invention.

The recovery and purification of weak acids, particularly organic acids, is of considerable importance to many industries, either as a means of preparing a product of high quality for specific uses, or of recovering such acids where they occur as by-products, or as excess reactants, in a process concerned with preparation of other materials. In the manufacture of cellulose acetate from cotton linters, for example, a 6–8 fold excess of glacial acetic acid and acetic anhydride is required over the theoretical quantity necessary for the acetylation reaction. Sulfuric acid is also employed in the reaction as a catalyst. The produced cellulose triacetate is precipitated from the excess of reagents by treatment with water, washed, dried and dissolved in a suitable solvent prior to spinning into fibers or conversion to other well known plastic products. The aqueous liquor separated from the precipitated cellulose acetate contains waste or excess acetic acid at concentrations varying from 10–40%, contaminated with sulfuric acid and salts of sulfuric and acetic acid introduced by the mineral content of the rinsing water.

To make cellulose acetate production competitive with other synthetic fiber processes, recovery of excess acetic acid and of the spinning solvent is essential. One common practice for acetic acid recovery invloves solvent extraction where cresol, or other solvents, selectively extracts the acetic acid from the aqueous phase and permits recovery of the acid at, or near, a concentration suitable for return to the acetylation chamber. The sulfuric acid and salts present in the wash solution, however, adversely affect the extracting step by precipitating within the extraction apparatus, by causing emulsification of the solvent, and by carrying over into the solvent-acetic acid phase. Loss of extracting capacity, downtime for cleaning extraction units, and loss of both extracting solvent and product result.

Another example of a process generating acetic acid, where the recovery of the spent reactant in a purified form is essential, is the epoxidation or hydroxylation of unsaturated oils. In one commonly utilized procedure, the oils are reacted with peracetic acids, formed from acetic acid and hydrogen peroxide in the presence of sulfuric acid as a catalyst. Following the separation of the oily products from the aqueous phase, recovery of the regenerated acetic acid, including separation from the sulfuric acid and contaminant salts, is required.

Another object of the present invention, therefore, is to provide an improved process for economically removing contaminating sulfuric acid and salts from such spent acetylation and epoxidation liquors to permit conventional concentration treatment.

The preparation of organic acids conventionally obtained by fermentation of natural products frequently presents the similar problem of removing strong mineral acids and/or their salts from aqueous solution prior to crystallization, solvent extraction or distillation recovery. Examples of organic acids which are prepared by fermentation methods include lactic, citric, levulinic, malic, gluconic, and glutamic acids, among others.

Conventionally, the substrate feed of natural product, usually a specific sugar leading to the desired organic acid after bacterial or mold conversion, is fortified with inorganic salts, nutrients, etc., before being seeded with the selected organism and fermented. In some instances, lime or other alkali is continuously fed to the reaction mixture to maintain optimum pH environment for the organisms, resulting in formation of the dilute calcium salt of the desired acid. Filtration to remove bacterial protein permits subsequent purification procedures, but has little, or no, effect upon dissolved salt impurities. In other instances, the free organic acid is filtered, then treated with lime to precipitate its calcium salt as an initial concentration and purification step.

In each case cited above, however, sulfuric acid is subsequently added to generate the free organic acid and to precipitate calcium sulfate. The freed acid is then concentrated and recovered by fractional crystallization, by distillation, or by solvent extraction followed by fractional distillation, with repetition of some of these stages to effect further purification. Objectionable contaminants include free sulfuric acid, calcium sulfate, and other salts of strong mineral acids, which persist despite these purification procedures.

Further objects of the present invention, therefore, are to provide improved processes for preparing highly refined levulinic, tartaric, lactic, gluconic and other acids derived from similar preparative procedures.

Niacin, or nicotinic acid, the antipellagric fraction ($B_5$) of vitamin B complex, is obtained—in one commercially practical procedure—as a by-product from destructive distillation of coal or related substances. It is "scrubbed" from the vapors discharged from the distillation step with water, and precipitated from hot aqueous solution by cooling and fractional crystallization. Obviously, from the nature of the generating procedure the aqueous extract is heavily contaminated with inorganic salts which retard crystallization of nicotinic acid from the mother liquor. Recycling mother liquor through the scrubbing section not only extracts additional niacin, but also concentrates ash contamination, further hampering isolation of purified product.

Additional objects of this invention are the removal of acids, salts, or mixtures thereof from nicotinic acid, ascorbic acid, or other acidic vitamins or antibiotics prepared by fermentation, distillation or similar means, utilizing specific processes aimed at improving purities and yields of these valuable substances.

In general, we have discovered an improved method for preferentially separating weakly dissociated acids present in aqueous or semiaqueous solutions at concentrations ranging from 1-90, or higher, from strongly dissociated acids, or of salts of strongly dissociated acids, or of mixtures thereof at concentrations varying from traces to 5%.

U.S. Patent Number 2,415,558, February 11, 1947, describes an early attempt to utilize the selective action of an anion exchange resin to preferentially react with and remove strong acids from their mixtures with weaker acids as a means of purifying the latter. As this patent teaches, however, the anion resins are employed in either the free base (hydroxide) form, or as a salt form equivalent to the weak anion being purified. Caustic soda, or other alkali, in amounts 1.75-2.0 times the theoretical, is required to regenerate the resin when exhausted by the selective acid separation, so that the procedure—while of marked utility— entails considerable cost. Many organic acids which cannot be prepared by conventional unit operations are being commercially purified by this technique.

We have discovered a much more simple, economical and direct method of effecting the desired separation. If a weak acid, contaminated with strong acids, is passed through the sulfate-exhausted form of a weakly or strongly basic anion exchanger, the selective separation described in the aforementioned patent occurs with preferential sorption of strong acids on the resin and discharge of weak acids from the bed at substantially the same concentration as the influent, but essentially free of the strong acids. We have further found that the exhausted resin may be readily regenerated with water alone, eliminating the need for costly alkali regenerant, and effecting a substantial decrease in the cost of conducting the separation. The technique permits cyclic or repetitious operation of the process.

We have further discovered that salts of strong acids, as well as the strong acids, present as minor constituents in a concentrated solution of a weak acid may be effectively removed by this selective action. In these instances, the treatment involves the initial passage of the mixture through a hydrogen regenerated cation exchanger where the acids of the salts are formed, followed by the preferential strong acids sorption on the sulfate form of the anion resin as disclosed above. We have found that essentially complete separation of strong acids from weak acids occurs throughout a broad range of weak acid concentration, i.e., at concentrations of weak acids from as little as 0.5% to as much as 90-95%.

Recent articles and patents on the subject have defined the sulfate-bisulfate equilibrium reaction of anion exchange resins as being dependent on the divalent-monovalent nature of sulfuric acid. When relatively concentrated solutions of sulfuric acid, for example, are applied to the sulfate $SO_4^=$, form of an anion exchanger, reversion of sulfate ion to bisulfate ion, $HSO_4^-$, occurs, so that one-half of the original capacity of the resin is released for further sorption of bisulfate ion from the externally applied sulfuric acid. Rinsing with water essentially decreases the acidity of the environment, causing the bisulfate ion (monovalent) to revert to sulfate ion (divalent). Sulfate ions so formed recombine with two exchange sites of the exchanger, sloughing-off the excess acid in the water rinse, and permitting reuse of "regenerated" resin in subsequent cycles.

In all of the literature references, however, the necessity of conducting this reaction in a highly acidic environment is reported, with the conclusion that the sulfate-bisulfate equilibrium does not occur at acidity concentrations of free mineral acid below 4-10% (40,000-100,000 p.p.m.). As a matter of record, most separations of this type reported in the literature specify strong acid concentrations greater than 10%, and as high as 25-30%. We have discovered, however, that both the preferential sorption of strong acids from their mixtures with weak acids, and the sulfate-bisulfate reaction occurs with strong acid concentrations as low as 0.3%, with evidence that separation will be as readily accomplished at even lower concentrations when substantially higher concentrations of weak acids, i.e., 1% to 95%, are present.

We conclude, therefore, that preferential sorption of even minute amounts of strong acids by the sulfate form of an anion exchanger from a mixture of weak and strong acids is made possible by the total hydrogen ion concentration of the mixture. The weak acids, although only slightly dissociated, contribute sufficient hydrogen ions to foster the conversion of sulfate ions fixed to the anion exchanger to bisulfate ions, and to provide the driving force which permits pickup of strong acids on the exchange sites so freed, a result not anticipated from prior art.

A partial list of the weak acids which may be purified by this procedure has been enumerated earlier. Strong acids which may be preferentially sorbed over weak acids by the sulfate form of an anion exchanger include sulfuric, hydrochloric, phosphoric and nitric acids. Similarly, the salts of these strong acids may be separated by the combination cation and anion exchange treatment disclosed above even when these salts are present in the weak organic acid at minor concentrations.

Mixtures of two weak acids, if of markedly different degrees of dissociation, or mixtures of such acids and one, or more, strong acids or their salts, may be readily separated by repetitive application of the process, one stage separating both weak acids from the strong acid, a second stage preferentially removing the stronger of the weak acids from the weaker, etc. Only anion exchangers in the sulfate form would be required to separate the mixture of two or more weak and strong acids. Cation and appropriate anion exchangers would be required to separate salts of strong acids from two or more weakly dissociated acids.

The subject process can be used to separate nonelectrolytes from strong acids and their salts. Typical nonelectrolytes that can be purified in this manner are glycerine, sorbitol, and other polyols, dextrose, sucrose and other mono- or di-saccharides, water- or solvent-soluble polymers of aliphatic or aromatic nature, etc. Even brackish waters, common in many areas, may be rendered potable, i.e., reduced in mineral salt content, by this process.

We have adapted this new process to conventional weakly or strongly basic anion-sulfate exchange processes (mixed acids separation), to two step cation and anion-sulfate exchange processes (mixed acids and salts separation), to mixed-bed cation and anion-sulfate exchange processes (mixed acids and salts separation), to strongly basic and weakly basic liquid anion exchange processes (mixed acids separation) and to processes involving both solid, resinous cation exchangers coupled with liquid anion exchangers in the sulfate form (mixed acids and salts separation).

We have further discovered that other advantages accrue from the use of a mixed bed of hydrogen form cation exchanger and sulfate form anion exchanger in this process, especially where the anionic impurities include salts or acids other than, or in addition to, sulfate ion. Conventionally, the sulfate-bisulfate equilibrium on anion resins permits removal of, for example, hydrochloric or nitric acids from other, less highly dissociated acids. In normal practice, downflow operation through the exchanger column is employed. To water regenerate a bed of anion resin exhausted to bisulfates, chlorides and nitrates, however, regeneration must be carried out by a water flow countercurrent (upflow) to the exhaustion flow in order to permit sulfate ion to displace the other strong anions. At the conclusion of the service procedure, the resin bed will consist of an upper layer essentially exhausted to chlorides and nitrates, and a lower layer exhausted to bisulfate ion. Water passed downflow would have no effect upon the former ions, and would convert only the bisulfate ion to sulfate, discharging the excess sulfuric acid generated from the bottom of the bed. Only one-half of the resin would therefore be converted to the necessary sulfate form. Lower capacities would result in the next treatment cycle, and if the procedure were continued in this fashion all capacity for strong acids would rapidly be depleted.

To counteract this depletion, the bed is rinsed upflow, which results in partial displacement of the chlorides and nitrates from the upper portion of the bed by the sulfuric acid generated in the lower portion. This revised regeneration technique, while effective, is cumbersome, requires special distributors to carry off spent rinse water from the surface of the bed, and necessitates means for preventing physical loss (by backwash) of resin from the column. Furthermore, the addition of extra sulfuric acid is required to displace completely the chlorides and nitrates. This is particularly true in cyclic operations where utilization of regenerant usually is not complete. In situations where ions are present for which the resin in the upper portion of the bed has preferential selectivity, this "upflow" technique proves entirely inadequate.

When mixtures of strong acids and salts, for example sodium chloride, magnesium nitrate, hydrochloric acid, are separated from weak acids by an intimate mixture of hydrogen cation and sulfate-form anion resins, however, the sulfuric acid conventionally used to regenerate the cation exchanger may be applied to the resin mixture as it exists in the column without separation of the bed into the two component fractions. The sulfuric acid not only serves to regenerate the cation exchanger, but also completely converts the portion of anion resin present in chloride or nitrate exhausted form to the bisulfate form, discharging chlorides and nitrates from the column. Full regeneration is insured by use of this method, thus by-passing difficulties with regeneration typical in the above outlined "upflow" system. The subsequent downward water rinse serves to rinse both resin components, removing excess regenerating acid and converting the bisulfate form of the anion resin to the necessary sulfate form. There is no progressive depletion of acid binding capacity, and no danger of backwashing resin from the column by upflow rinsing, when direct sulfuric acid and water rinses are applied to the intimately mixed bed in a downflow operation.

The above process compares favorably with conventional methods of regenerating a mixed bed. In the conventional method, the anion fraction is regenerated first, passing caustic from the top of the column through the bed and out the interface between anion (top) and cation (bottom) fractions. The cation portion is then regenerated with acid passing through the interface downward through the cation resin and out the bottom. Both component fractions are rinsed separately for a short period of time, then mixed, and finally the mixed bed is rinsed to quality. The simultaneous regeneration of cation and anion fractions after separation by backwash is described in U.S. Patents 2,771,424 and 2,891,007. In this process the separated resins are simultaneously regenerated by passing one regenerant downward through the upper bed and by passing the other regenerants upward through the lower bed, both streams meeting at the midpoint of the two beds. The joined streams are then simultaneously discharged from the system. Immediately following the regeneration step the bed is rinsed free of regenerant. After the rinsing, the resins are air blown (upward) resulting in an integral mixture of the particles present in the container.

The subject sulfuric acid-water downflow technique has the advantage, of course, that no separation of the resin is required and that it is not necessary to use separate regenerants when treating the bed. It is also an advantage that the cation exchanger and anion exchanger do not require remixing.

The subject purification process may be carried out at temperatures ranging from ambient to as high as 190° F. or higher, based on known stabilities of resins in the salt or acid forms utilized, and at pressures ranging from partial vacuum to substantially greater than atmospheric pressures, if required.

The process is operable in aqueous solution, in mixtures of water and water-soluble solvents, or in polar or semipolar solvents. Water-soluble, polar and semipolar solvents include: lower aliphatic alcohols such as ethyl, methyl, isopropyl; ketones such as acetone and dimethyl ketone; polyols such as glycerol and ethylene glycol; ethers such as diethyl ether, di-isopropyl ether, etc.

The following examples of readily reproducible procedures illustrate the basic principles and operation of our invention.

EXAMPLE I

In the production of glycerine from certain natural substances, contamination with small quantities of sulfuric acid and sulfate salts occasionally occurs. To prevent degradation of the glycerine to acrolein during the final vacuum distillation, demineralization treatment normally is applied to the still feed for sulfate ion removal. Both acid for cation unit regeneration and caustic for anion unit regeneration are required to restore capacity when the system is exhausted.

The following test was conducted to demonstrate the advantages of treating contaminated 80% glycerine by a mixed ion exchange bed consisting of cation resin in the hydrogen form and anion resin in the sulfate form:

Nalcite SBR, a strongly basic anion exchange resin made in accordance with U.S. Patent 2,591,573, consisting of granular, bead-form particles passing through a 20 mesh screen and retained on a 50 mesh screen, was converted to the sulfate, $SO_4^=$, form by treatment in a column with a dilute solution of sulfuric acid until no anions other than sulfate ions were detected in the spent effluent. A deionized water rinse was then applied until excess sulfate ions were removed and the bed was completely converted to the sulfate form.

The sulfate form anion resin was intimately mixed with Nalcite HCR–W in a ratio of 2.5 volumes anion resin to 1.0 volume of Nalcite HCR–W. Nalcite HCR–W is a hydrogen form sulfonated styrene-divinylbenzene strongly acid cation exchanger manufactured in accordance with U.S. Patent 2,366,007, and consists of granular, bead-form particles which pass through a 20 mesh screen and are retained on a 50 mesh screen. The mixture was charged into an appropriate exchange column fitted with inlet and outlet connections and a resin supporting grid.

The impure glycerine solution had the characteristics reported in Table IA.

Table IA

Glycerine, 81%, Sp. Gr. _____ 1,21
Free sulfuric acid, as $SO_4^=$, 0.049% p.p.m. _____ 490
Sulfate salts, as $SO_4^=$, .025%, p.p.m. _____ 250

The impure glycerine was heated to a temperature of 140–150° F. to reduce its viscosity, then passed through the mixed resin exchanger at a rate of approximately ½ g.p.m. per square foot of area. The results obtained are tabulated in Table IB.

Table IB
EFFLUENT ANALYSIS, SALTS AND SULFURIC ACID REMOVAL BY MIXED BED PROCEDURE

| Fraction Number | Vol. collected, Successive ml. | Glycerine, Weight Percent | Residual $SO_4^=$, p.p.m. |
|---|---|---|---|
| 1 | 0–75 | Bed void volume | 0 |
| 2 | 76–100 | 33 | 0 |
| 3 | 101–125 | 79 | 0 |
| 4 | 126–150 | 81 | 0 |
| 5 | 151–200 | 81 | 0 |
| 6 | 201–300 | 81 | 0 |
| 7 | 301–400 | 81 | Trace |
| 8 | 401–425 | 81 | 23 |
| 9 | 426–450 | 81 | 150 |
| 10 | 451–475 | 81 | 270 |
| 11 | 476–500 | 81 | 450 |

Fraction 1 represented the bulk of the water displaced from the void volume of the resin bed. Fractions 2 through 7 represented treated, sulfate-free glycerine. The remaining fractions demonstrated the breakthrough of sulfuric acid, or its salts, as the capacity of the mixed bed was consumed.

A capacity of approximately 9 kilograms for sulfuric acid and its salts was obtained.

EXAMPLE II

This test was conducted to demonstrate the feasibility and advantages of treating the acetylation rinse liquor by a resin in which cation and anion resin particles are intimately mixed in one column. It was intended also to demonstrate the ease with which mixed strong acids and/or their salts, i.e., sulfuric and hydrochloric acids, could be separated from weaker acids without need for specialized, countercurrent regeneration of the anion exchanger, as defined in the specification.

Based on the capacity determinations obtained in test work of Example VIII, 270 milliliters of a mixed bed consisting of 1 volume of Nalcite HCR, hydrogen form, and 2.75 volumes of Nalcite SBR–P, sulfate form, both 50–100 mesh size, were charged into an appropriate retaining column. A rinse with deionized water, followed by air mixing assured a uniform bed. The feed solution utilized in Example II was treated with concentrated hydrochloric acid to prepare a mixed strong acid and salt contaminant. The composition of the modified solution was as follows:

Table IIA
ANALYSIS, MODIFIED SPENT ACETYLATION LIQUOR

| | Weight Percent | P.p.m. |
|---|---|---|
| Acetic Acid | 31.2 | 31,200 |
| Magnesium Sulfate | 0.6 | 6,000 |
| Calcium Sulfate | 0.01 | 102 |
| Total Sulfates | 0.74 | 7,400 |
| Sulfuric Acid | 0.259 | 2,590 |
| Hydrochloric Acid | 0.1 | 1,000 |

The modified feed solution was passed through the mixed bed at a rate of 1 g.p.m. per cubic foot of resin, with appropriate samples being collected and analyzed for residual acetic acid and contaminant leakage. The results obtained are reported in Table IIB.

Table IIB
EFFLUENT ANALYSIS, SALTS AND MIXED STRONG ACIDS REMOVAL BY MIXED BED PROCEDURE

| Fraction Number | Vol. Collected, Successive, ml. | Av. Res. Acetic Acid, Percent | Av. Sulfate Ion, $SO_4^=$, p.p.m. | Av. Chloride Ion, $Cl^-$, p.p.m. | Av. Metal Cation, p.p.m. |
|---|---|---|---|---|---|
| 1 | 0–100 | 0–Trace | 0 | 0 | 0 |
| 2 | 101–200 | 32.1 | 0 | 0 | 0 |
| 3 | 201–300 | 32.1 | 0 | 0 | 0 |
| 4 | 301–400 | 32.1 | 30 | 0 | 0 |
| 5 | 401–600 | 32.1 | 32 | 0 | 0 |
| 6 | 601–800 | 32.1 | 50 | 5 | 0 |
| 7 | 801–900 | 32.1 | 60 | 14 | 0 |
| 8 | 901–950 | 32.1 | 690 | 50 | 0 |
| 9 | 951–1,000 | 32.1 | 3,320 | 180 | 0 |
| 10 | 1,001–1,050 | 32.1 | 6,300 | 293 | 0 |

Based on terminating the run with fraction 7, and deducting fraction 1 (void water displacement) a net capacity of 800 ml. of 32.1% acetic acid substantially free of strong acids or salts was obtained. This was equivalent to a cation capacity for metal ions of approximately 12–13 kilograins per cubic foot, and an anion capacity of 10–11 kilograins per cubic foot.

The mixed bed was briefly rinsed with water to remove the excess feed solution, then regenerated without separation into component fractions with 3% sulfuric acid at a regeneration level of 8 pounds of 66° sulfuric acid per cubic foot of the cation component. The spent regenerant contained magnesium, calcium, chloride and sulfate ions, together with excess acidity. Finally, the column was rinsed with deionized water until only traces of acidity and sulfate remained. A second exhaustion of the bed so regenerated yielded results essentially identical with those reported for the first run, vertifying the practicality of the procedure.

EXAMPLE III

This experiment was conducted to determine the feasibility of purifying a mother liquor containing nicotinic acid, a weak organic acid, from its contaminating salts by a mixed bed consisting of hydrogen form Nalcite HCR and sulfate form Nalcite SBR–P in a resin volume ratio of 1 to 1.

An actual spent liquor sample obtained from the process described above was analyzed for residual nicotinic acid, free mineral acids, and mineral salts. The analysis of the feed solution was as follows:

Table IIIA

| | Wt. percent | P.p.m. |
|---|---|---|
| Nicotinic Acid | 2.4 | 24,000 |
| Free Mineral Acids ($CaCO_3$) | 0–Trace | 150 |
| Sulfate (Salts), $SO_4^=$ | 0.156 | 1,560 |
| Chloride (Salts), $Cl^-$ | 0.06 | 600 |
| pH—3.2 | | |

One liter of the solution heated to 50–160° F. was passed through a 200 ml. bed of the mixed resin at a rate of 1 g.p.m. per cubic foot. Samples were collected and analyzed for organic acid, mineral acids and mineral anions, as reported in Table IIIB.

Table IIIB
EFFLUENT ANALYSIS, REMOVAL OF SALTS FROM NICOTINIC ACID BY MIXED BED PROCEDURE

| Fraction Number | Vol. Collected, Successive ml. | Nicotinic Acid | Res. Sulfate, $SO_4^=$, p.p.m. | Res. Chloride, $Cl^-$, p.p.m. | Res. Metal Cations, p.p.m. |
|---|---|---|---|---|---|
| 1 | 0–100 | 0.1 | 0 | 0 | 0 |
| 2 | 101–400 | 2.1 | 0 | 0 | 0 |
| 3 | 401–700 | 2.4 | 0 | 0 | 0 |
| 4 | 701–800 | 2.4 | 15 | 23 | 0 |
| 5 | 801–900 | 2.4 | 30 | 45 | 0 |
| 6 | 901–1,000 | 2.4 | 50 | 72 | 0 |
| 7 | 1,001–1,100 | 2.4 | 400 | 525 | 143 |

Fraction 1 represented resin bed water voids; fractions 2 through 6 indicated production of nicotinic acid substantially free of salt contaminants. Fraction 7 indicated essentially simultaneous exhaustion of both cation and anion components. Regeneration as a mixed bed with sulfuric acid, followed by deionized water rinses as described in Example II, permitted a second exhaustion cycle essentially duplicating the results reported in Table IIIB. Capacity of the hydrogen exchanger was approximately 12 kilograms per cubic foot, capacity of the sulfate form anion exchanger approximately 11 kilograins per cubic foot.

EXAMPLE IV

This test was also carried out to demonstrate the feasibility and advantages of deionizing a simulated brackish water with a mixed resin bed in which cation and anion particles are intimately mixed in one column.

A 46.5 milliliter portion of hydrogen from Nalcite HCR–W, a sulfonated styrene divinylbenzene strongly acidic cation exchanger manufactured in accordance with U.S. Patent 2,366,007, consisting of granular, bead-form particles passing through a 20 mesh screen and retained on a 50 mesh screen, and a 138.5 milliliter portion of Nalcite SBR–P, a strongly basic quaternary anion exchange resin made in accordance with the basic instructions of U.S. Patent 2,591,573, also consisting of granular, bead-form particles passing through a 20 mesh screen and retained on a 50 mesh screen, the anion resin previously converted to the $SO_4^=$ form in a manner described in Example I, were charged into a ½ inch diameter column forming a bed of intimately mixed particles. A feed solution consisting of NaCl and demineralized water was prepared, the NaCl concentration of the solution being 198.6 grains/gallon as NaCl. This solution was passed through the mixed resin bed at a rate equivalent to approximately 1 g.p.m. per cubic foot of resin. The conductivity of the effluent was observed throughout the test and was employed as a quantitative measurement of NaCl leakage. During the passage of the first 640 ml. of exhaustant, the average NaCl leakage was less than 4 p.p.m. After a 670 ml. quantity of exhaustant had passed, the NaCl leakage was approximately 20 p.p.m. The point at which 20 p.p.m. of NaCl leakage was observed was taken as the breakthrough capacity of the bed.

Based on terminating the run after 670 ml. of exhaustant had passed, and deducting 70 ml. void water displacement, a net capacity of 600 ml. of exhaustant substantially free of NaCl was obtained. This was equivalent to a cation resin capacity of approximately 19–20 kilograins per cubic foot and an anion resin capacity of approximately 6.5 kilograins per cubic foot.

The mixture was regenerated with 2% $H_2SO_4$ at a regenerant level of 3 pounds per cubic foot of mixed resin and then rinsed with deionized water until no $SO_4^=$ ions were detected in the effluent.

A second exhaustion of the bed so regenerated yielded results essentially identical with those reported for the previous run, verifying the practicality of the procedure.

EXAMPLE V

This test was conducted to demonstrate the removal of dissolved mineral solids from a defecated and diluted invert molasses (prepared from canesugar) prior to fermentation to gluconic acid. The object, in this instance, was partial de-ashing to provide optimum mold growth conditions.

A mixed bed of Nalcite SBR, sulfate form, and Nalcite HCR–W, hydrogen form, was prepared in accordance with Example I using a ratio of 1 volume cation resin to 2 volumes anion resin. The syrup, heated to 120° F., was passed through a column of the mixture at a flow rate of 1 g.p.m. per cubic foot. The results obtained are reported in Table VA:

Table VA

EFFLUENT ANALYSIS, INVERT MOLASSES DE-ASHING BY MIXED BED PROCEDURE

| Fraction Number | Vol. Collected, Successive ml. | Invert Sugar, weight percent | Dis. Min. Solids, p.p.m. $CaCO_3$ | Sulfate, p.p.m. $SO_4^=$ | Chloride, p.p.m. $Cl^-$ |
|---|---|---|---|---|---|
| Feed | | 25.0 | 6,532 | 2,360 | 825 |
| 1 | 0–50 | | Bed Void Volume | | |
| 2 | 51–100 | 11.3 | 34 | 0 | 0 |
| 3 | 101–150 | 24.8 | 174 | 0 | 0 |
| 4 | 151–200 | 25.0 | 225 | 3 | 0 |
| 5 | 201–250 | 25.0 | 511 | 38 | 0 |
| 6 | 251–300 | 25.0 | 930 | 400 | 2 |
| 7 | 301–350 | 25.0 | 3,175 | 2,180 | 15 |

Fraction 1 represented water displaced from the void volume of the bed. Fractions 2 through 6 represented substantially de-ashed sugar syrup. The dissolved solids in excess of sulfate and chloride content (fractions 2–6) were caused by weak acids, gluconic and aconitic, which were not absorbed on the sulfate form resin.

The exhausted bed was rinsed with one-two bed volumes of water to remove sucrose remaining in the column. The bed was then regenerated—as a mixed bed without separation into component fractions by backwashing—with a 5% solution of sulfuric acid at a regeneration level of 3.5 pounds of 66° $H_2SO_4$ per cubic foot of mixed bed. The excess acid was removed with a water rinse, followed by a final rinse to complete conversion of the anion resin to the sulfate, $SO_4^=$, form.

A second exhaustion run was made to demonstrate the cyclic nature of the operation. The results were as follows:

Table VB

EFFLUENT ANALYSIS, RUN 2, INVERT MOLASSES DE-ASHING BY MIXED BED PROCEDURE

| Fraction Number | Vol. Collected, Successive ml. | Invert Sugar, weight percent | Dis. Min. Solids, p.p.m. $CaCO_3$ | Sulfate, p.p.m. $SO_4^=$ | Chloride, p.p.m. $Cl^-$ |
|---|---|---|---|---|---|
| 1 | 0–50 | | Bed Void Volume | | |
| 2 | 51–100 | 14.3 | 42 | 0 | 0 |
| 3 | 101–150 | 24.6 | 197 | 0 | 0 |
| 4 | 151–200 | 25.0 | 300 | 0 | 0 |
| 5 | 201–250 | 25.0 | 345 | 32 | 0 |
| 6 | 251–300 | 25.0 | 580 | 416 | 7 |
| 7 | 301–350 | 25.0 | 715 | 730 | 11 |
| 8 | 351–400 | 25.0 | 1,400 | 1,800 | 23 |

The results of the second run were essentially identical to those of the first, verifying the feasibility of cyclic operation using a common acid regenerant.

EXAMPLE VI

This test was conducted to demonstrate the feasibility of removing hydrochloric acid from boric acid, a weak inorganic acid, by means of the sulfate form of a weakly basic anion exchanger.

Boric acid solution, at approximately 1.2–1.5% concentration, is regularly utilized as a moderator in nuclear reactors and fuel storage pits. Contamination with corrosion products and with salts introduced by condenser water leakage requires periodic cleanup of the solution to prevent accumulation of radioactivity in the moderator liquid. Conventionally, demineralization equipment comprising a hydrogen cation exchanger and the hydroxide or borate form of an anion exchanger is employed to reduce there contaminants, using the selective strong acid sorption technique revealed in U.S. Patent 2,415,558. A synthetic 1.5% solution of boric acid contaminated with 5,000 p.p.m. of hydrochloric acid was prepared to simulate such a contaminated solution after hydrogen exchange treatment.

A 100 milliliter portion of Nalcite WBR, a weakly basic anion exchange resin prepared in accordance with U.S. Patent 2,591,574, consisting of bead-form particles passing through a 20 mesh screen and retained on a 50 mesh screen, was charged into a ½ inch diameter column to a height of approximately 33 inches. The resin was converted to the sulfate form by treatment with excess dilute sulfuric acid, then rinsed until free acidity and sulfate ions were absent. The bed was now in the sulfate form.

The synthetic acid mixture was passed downflow through the bed at a rate of 1 g.p.m. per cubic foot, with effluent fractions collected and analyzed for residual boric and hydrochloric acids. The results are tabulated in Table VIA.

*Table VIA*

EFFLUENT ANALYSIS, STRONG ACID REMOVAL

| Fraction Number | Vol. Collected, Successive ml. | Av. Resid. Boric Acid, p.p.m. | Av. Resid. Hydrochloric Acid, p.p.m. |
|---|---|---|---|
| Feed | | 15,000 | 5,000 |
| 1 | 0–50 | 125 | 0 |
| 2 | 51–100 | 14,800 | 0 |
| 3 | 101–200 | 15,000 | 0 |
| 4 | 201–300 | 15,000 | Trace |
| 5 | 301–350 | 15,000 | 12 |
| 6 | 351–375 | 15,000 | 122 |
| 7 | 376–400 | 15,000 | 325 |
| 8 | 401–425 | 15,000 | 4,300 |

The feed was discontinued at this point, the bed was drained to remove excess feed solution, and was then washed with deionized water in a flow direction countercurrent (upflow) to the exhaustion cycle:

| | | | |
|---|---|---|---|
| 9 | 0–50 | 2,000 | 3,000 |
| 10 | 51–150 | Trace | 6,230 |
| 11 | 151–250 | 0 | 4,890 |
| 12 | 251–350 | 0 | 2,470 |
| 13 | 351–450 | 0 | 1,380 |
| 14 | 451–550 | 0 | 380 |
| 15 | 551–650 | 0 | 110 |
| 16 | 651–750 | 0 | Trace |

Fraction 1 represented water displaced from the voids. Fractions 2 through 7 contained boric acid substantially free of contaminating hydrochloric acid. A capacity of approximately 10 kilograins per cubic foot of weakly basic resin was realized. Fractions 9 through 16 illustrate the water regeneration of the bisulfate exhausted bed, proving that cyclic operation is feasible.

EXAMPLE VII

Acetic acid, a weak organic acid, is obtained as a waste by-product from a plastic polymer manufacturing operation at a concentration of 5–8% in aqueous solution. To recover the acid value, ethanol and sulfuric acid catalyst are added and the mixture fractionated in a distillation column, generating and separating ethyl acetate as a distillate. Although much of the acetic acid is thereby recovered, the still's bottom fraction contains 1–2% of unreacted acetic acid together with 0.3–0.5% spent sulfuric acid catalyst and traces of ethanol. Continuous return of the sulfate contaminated acid to the ester generating reaction is desirable for further recovery, but is hampered by build-up of sulfuric acid in the system.

The following test was conducted to demonstrate the feasibility of separating contaminating sulfuric acid from the acetic acid in the still bottom, using an actual bottoms sample as feed:

An 85 milliliter portion of Nalcite SBR, a strongly basic anion exchange resin made in accordance with U.S. Patent 2,591,573, consisting of granular, bead-form particles passing through a 20 mesh screen and retained on a 50 mesh screen, was charged into a ½ inch inner diameter glass column fitted with inlet and outlet connections and resin supporting grid to a bed depth of approximately 28 inches. The resin was completely converted to the sulfate, $SO_4^=$, form by treatment with a 1% solution of sulfuric acid until no chlorides or anions other than sulfate were detected in the effluent. Thereafter, the bed was washed with deionized water until no acidity or sulfate ion were evident in the spent rinse. The bed was now in the sulfate-exhausted form.

The still bottom sample having the composition shown in Table VIIIA was percolated through the bed at a rate equivalent to 1 g.p.m. per cubic foot of resin. Effluent fractions were analyzed for residual acetic and sulfuric acids, and the run terminated when the latter appeared in the effluent increasing quantities to signify the end of the cycle.

*Table VIIA*

EFFLUENT ANALYSIS, STRONG ACID REMOVAL PROCEDURE

| Fraction Number | Vol. Collected, Successive ml. | Av. Resid. Acetic Acid, p.p.m. | Av. Resid. Sulfuric Acid, p.p.m. |
|---|---|---|---|
| Feed | | 15,000 | 7,000 |
| 1 | 0–40 | 0–Trace | 0 |
| 2 | 41–80 | 3,000 | 0 |
| 3 | 81–120 | 9,700 | 0 |
| 4 | 121–160 | 15,000 | 0 |
| 5 | 161–240 | 15,200 | 0 |
| 6 | 241–320 | 15,100 | Trace |
| 7 | 321–340 | 15,000 | 6,500 |
| 8 | 341–350 | 15,000 | 7,000 |

Feed of still bottom sample was discontinued at this point, the bed drained to remove excess of feed solution, and then rinsed with deionized water:

| | | | |
|---|---|---|---|
| 9 | 0–40 | 1,000 | 900 |
| 10 | 41–80 | Trace | 11,000 |
| 11 | 81–160 | 0 | 7,500 |
| 12 | 161–240 | 0 | 1,800 |
| 13 | 241–320 | 0 | 430 |
| 16 | 481–560 | 0 | 0–Trace |

Fraction 1 represented the bulk of the water displaced from the voids of the resin bed. Fractions 2 through 6 were acetic acid essentially free of contaminating sulfuric acid, while fractions 7 and 8 were approximately equivalent to the feed, demonstrating that the capacity of the exchanger had been reached. A capacity of approximately 10 kilograins, 1.4 pounds, of sulfuric acid per cubic foot was obtained.

Fractions 9 through 16 demonstrate the regeneration of the exhausted bed with water. A volume of rinse water equivalent to 3–5 resin bed volumes was required to prepare the resin for a second cycle. Following water regeneration, the bed was subjected to a second pass of feed sample. Results substantially identical with those given in Table VIIA were obtained in the second run.

EXAMPLE VIII

A typical sample of by-product acetic acid obtained from cellulose acetylation by the process described above was subjected to analysis with the following results:

*Table VIIIA*

ANALYSES, SPENT ACETYLATION LIQUOR

| | Weight percent | P.p.m. |
|---|---|---|
| Acetic Acid | 31.2 | 312,000 |
| Magnesium Sulfate | 0.6 | 6,000 |
| Calcium Sulfate | 0.01 | 102 |
| Total Sulfates, $SO_4^=$ | 0.74 | 7,400 |
| Sulfuric Acid | 0.259 | 2,590 |
| Sus. Matter (Cellulose Acetate) | 0.1 | 1,000 |

The solution represented by this analysis was subjected to a two-bed exchange system of hydrogen exchange resin and sulfate form strongly basic anion resin to determine the feasibility of separating both strong acids and salts from a weak acid. In the process, a 100 milliliter portion of hydrogen form Nalcite HCR, a sulfonated styrene-divinylbenzene strongly acidic cation exchanger manufactured in accordance with U.S. Patent 2,366,007, consisting of granular, bead-form particles passing through a 50 mesh screen and retained on a 100 mesh screen, was charged into a ½ inch diameter column to prepare a bed approximately 32 inches deep. The bed was backwashed, then rinsed downflow with deionized water until the effluent was free of all dissolved solids. A similar bed of Nalcite SBR-P, a strongly basic quaternary anion exchange resin made in accordance with the basic instructions of U.S. Patent 2,591,573, consisting of granular, bead-form particles passing through a 50 mesh screen and retained on a 100 mesh screen, was prepared, washed, and converted to the sulfate form in the manner described in Example I. The cation column was mounted to discharge into the anion column, simulating full scale series apparatus. Thereafter, a sample of the acetylation rinse liquor was allowed to pass through the cation and anion beds in series at a rate equivalent to approximately 1 g.p.m. per cubic foot of resin. Effluent fractions were collected and analyzed for acetic acid, sulfate salts and free sulfuric acid, terminating the run when sulfate ions appeared in increasing quantities. The results are tabulated in Table VIIIB.

*Table VIIIB*

| Fraction Number | Vol. Collected, Successive ml. | Av. Res. Acetic Acid, percent | Av. Sulfate, $SO_4^-$, p.p.m. | Av. Metal Cations, p.p.m. |
|---|---|---|---|---|
| 1 | 0–90 | 0–Trace | 0 | 0 |
| 2 | 91–190 | 30 | 0 | 0 |
| 3 | 191–290 | 31.2 | 5 | 0 |
| 4 | 291–390 | 31.15 | 10 | 0 |
| 5 | 391–490 | 31.2 | 10 | 0 |
| 6 | 491–540 | 31.2 | 1,050 | 20 |
| 7 | 541–590 | 31.2 | 7,400 | 80 |

Fraction 1 represented the bulk of the water displaced from the voids of the two beds. Fractions 2 through 5 represented purified acetic acid, essentially completely free of both sulfuric acid and its magnesium and calcium salts. Fraction 6 illustrates the partial exhaustion of the anion bed with leakage of sulfuric acid. Fraction 7 illustrates the complete exhaustion of the anion resin and increasing exhaustion of the cation resin.

After collection of fraction 7, the two columns were separately regenerated. The cation column was treated with approximately 5 pounds of 66° sulfuric acid per cubic foot of resin, applied as a 4% solution, and rinsed free of acidity with deionized water. The anion column was rinsed with deionized water only until no free acidity and sulfates were evident in the effluent. Thereafter, the cycle was repeated with results essentially identical with those obtained for the first run.

Based on other capacity determinations of the cation and anion columns on this liquor, the former was found to have a capacity for conversion of the metal cations in the acetic acid of approximately 14 kilograins per cubic foot at a regeneration acid consumption of 4–5 pounds of 66° acid per cubic foot. The sulfate form anion resin was found to have a water regenerated capacity for sulfuric acid of approximately 12 kilograins per cubic foot.

EXAMPLE IX

This test was performed to demonstrate the feasibility of separating strong acids from weak acids by means of a liquid anion exchanger converted to the sulfate, $SO_4^=$, form, with subsequent water regeneration of the bisulfate, $HSO_4^-$, exhausted exchanger to reconvert it to sulfate form and permit cyclic operation.

The test solution was made up to contain 2% formic acid, a weak organic acid, and 1% sulfuric acid.

A solution of "Aliquat 336," tricaprylmonomethylammonium chloride, a liquid, water-insoluble, quaternary amine manufactured by the General Mills Corporation, was added to commercial kerosene diluent to a volume concentration of approximately 10%, or 0.2 molar. The theoretical sulfuric acid binding capacity of the free base amine in this solvent mixture is 10 grams per liter of solvent. Based on this capacity, further addition of a strong acid to the sulfate saturated exchanger was expected to convert each sulfate ion bound to two exchange sites to bisulfate ion occupying one exchange site, and permit an additional strong acid sorption of 5 grams of sulfuric acid per liter of solvent. The solvent mixture was washed repeatedly with dilute sulfuric acid in a separatory funnel until no chlorides were detected in the aqueous fraction. The mixture was then washed with deionized water until no free sulfates and acidity were present in the wash water. The amine was assumed to be completely in the sulfate exhausted form at this time.

One hundred (100) milliliters of an aqueous mixture containing 2% formic acid (a weak organic acid) and one gram of contaminating sulfuric acid in addition to the formic acid to be purified, was vigorously mixed with 200 milliliters of the solvent mixture prepared above for a period of 3–5 minutes. The mixture was allowed to separate into the component phases and the aqueous phase was drawn off and analyzed for residual sulfate and formic acid. Only traces of sulfate ion, less than approximately 15 p.p.m. were present. The formic acid content, determined by conductimetric and specific formate analyses, was approximately 1.95%.

The test was repeated, using 225 milliliters of the solvent mixture and 100 milliliters of the impure acid mixture, since the sulfate leakage during the first test indicated insufficient acid binding capacity. No sulfate ion, as determined by standard barium chloride precipitation tests, was found in the aqueous phase at the conclusion of the separation cycle. The formic acid content remained at 1.95–2.0%.

The exhausted solvent phase from the test above was washed repeatedly with deionized water, with collection of the washings. After four or five washings, the aqueous phase was free of sulfate ions and acidity, indicating complete reconversion of the bisulfate exhausted exchanger to the sulfate form. The wash water was checked for sulfate, which totaled approximately 0.97 gram as sulfuric acid, about 97% recovery of the sulfuric acid separated from the impure acid mixture.

The regenerated solvent was subjected to three consecutive exhaustion-regeneration passes with the acid mixture to demonstrate the purification on a cyclic basis. Substantially identical results were obtained in all four tests.

As outlined above, the subject processes can be used to separate any one of a large number of weak organic or inorganic acids and nonelectrolytes from strong acids, from salts of such strong acids, or from mixtures thereof. The concentration of strong acids, or salts of strong acids, present in these products as contaminants can vary from as little as 0.3% or less, to substantially higher percentages. The process is particularly effective in treating solutions containing 20–40% weak acids, such as acetic acid or citric acid, and has particular importance in purifying contaminated acetic acid resulting from the acetylation of cellulose, where the acetic acid content varies from about 29% to 32%.

As was indicated above, the removal of free strong acids, is readily carried out by treatment with the sulfate form of a weakly basic anion or a strongly basic anion exchanger. The anion exchanger may be either a granular, solid exchange resin, or a liquid anion exchanger. Salts of strong acids or mixtures of such salts and the free acids may be removed from weak acids by treatment with a two-bed cation-anion exchange system, or a mixed bed cation-anion system. The cation exchanger is utilized in the hydrogen form. The anion exchanger may be either strongly basic or weakly basic. Where only free strong mineral acids are to be removed, weakly or strongly basic liquid anion exchangers may be used. The sulfate form of the anion exchanger is utilized in every instance.

In general, by strong acid we mean an acid having an ionization constant of at least about $7.5 \times 10^{-3}$. Such acids would include sulfuric acid, hydrochloric acid, phosphoric acid, phosphorous acid, among others. By weak acid we mean an acid having an ionization constant no greater than about $1 \times 10^{-3}$. Such acids include acetic acid, lactic acid, malonic acid, tartaric acid, malic acid, benzoic acid, citric acid, fumaric acid, glutari acid, itaconic acid, pimelic acid, among others. Where salts of strong acids are present, an H⁻ cation unit is essential to generate the free acid. Once the free acid has been generated, the sorption of the strong acid on sulfate form resin is dependent on the ionization constant of the strong acid.

In the case of nonelectrolytes such as glycerine or sucrose, one is not concerned with weak acids or their ionization strengths. Such nonelectrolytes can be purified by removing strong acids on a sulfate form anion exchanger. Weak acids such as acetic acid or citric acid cannot be removed in this manner.

In the purification and/or separation process using a mixed bed, the ratio of cation to anion resin can vary widely, for example, from about 80% cation to 20% anion, to from about 20% cation to about 80% anion. The exact proportions can be worked out without difficulty for each specific application in order to obtain exhaustion of both resin forms at approximately the same time.

In our regeneration process, the mixed bed is regenerated with an aqueous solution of $H_2SO_4$. The strength of the solution can vary from about 1% $H_2SO_4$ to about 15% $H_2SO_4$, and preferably from about 2% to about 10% $H_2SO_4$. The regenerant level, when defined on the total volume of mixed bed (and not on the cation fraction thereof) will vary (a) in proportion of cation to anion, and (b) in accordance with cation regeneration level needed. The following example illustrates the possible variations:

| Mixture | Acid Required | |
|---|---|---|
| | Per c.f. Cation | Per c.f. Mixed Bed |
| 1C–1A | 5 | 2.5 |
| 1C–1A | 10 | 5.0 |
| 3C–1A | 10 | 7.5 |
| 1C–3A | 10 | 2.5 |

As an extreme regenerant level one could select a ratio of one cation to four anion and an acid dosage of three pounds of acid per cubic foot of cation, equivalent to a minimum of about 0.6 pound of acid per cubic foot of mixed bed. At the other extreme, one could select a ratio of four cation to one anion and a dosage of 15 pounds of sulfuric acid per cubic foot of cation, or 12 pounds of acid per cubic foot of mixed bed.

The preferred amount of acid should be based on a mixture containing equivalent capacity ratios of about 1 volume cation (21 kilograins per cubic foot capacity) to 1.5 volumes of anion (14 kilograins per cubic foot in the sulfate cycle) and an acid level of 4 pounds to 8 pounds per cubic foot of cation resin, equivalent to a *mixed* bed regeneration level of 1.6–3.2 pounds per cubic foot.

As was noted above, the subject process can be used to purify and/or separate both weak electrolytes, such as the aforementioned weak organic acids, and nonelectrolytes. Typical examples of nonelectrolytes which can be purified by this process include glycerine, sorbitol, and other polyols, dextrose, sucrose and other mono- or di-saccharides, water- or solvent-soluble polymers of aliphatic or aromatic nature, etc.

Obviously, many modifications and variations of the invention as hereinbefore set forth may be made without departing from the spirit and scope thereof, and therefore only such limitations should be imposed as are indicated in the appended claims.

We claim:

1. A process for removing salts of strong acids from a solution containing from about 0.5% to about 5.0% of said salts and containing from 0.5% to 95% of a material selected from the group consisting of weak electrolytes and nonelectrolytes which comprises: passing said solution through a mixed resin bed comprised of a cation exchanger in the hydrogen form and an anion exchanger in the sulfate form, said anion exchanger being selected from the group consisting of a strongly basic solid anion exchanger and a weakly basic solid anion exchanger.

2. A process for removing mixtures of strong acids and salts of strong acids from a solution having a combined concentration of said strong acids and said salts of from about 0.5% to about 5.0% and containing from 0.5% to 95% of a material selected from the group consisting of weak electrolytes and nonelectrolytes which comprises: passing said solution through a mixed resin bed comprised of a cation exchanger in the hydrogen form and an anion exchanger in the sulfate form, said anion exchanger being selected from the group consisting of a strongly basic solid anion exchanger and a weakly basic solid anion exchanger.

3. A process for removing mixtures of strong acids and salts of strong acids from a solution containing a weak acid which comprises: passing said solution through a mixed resin bed comprised of a cation exchanger in the hydrogen form and an anion exchanger in the sulfate form, said anion exchanger being selected from the group consisting of a strongly basic solid anion exchanger, said solution having a weak acid concentration of 0.5% to 95% and having a combined strong acid and strong acid salt concentration of from about 0.5% to about 5.0% and a weakly basic solid anion exchanger.

4. A process for removing salts of strong acids from a solution containing from about 0.5% to about 5.0% of said salts and containing from 0.5% to 95% of a material selected from the group consisting of weak electrolytes and nonelectrolytes which comprises: passing said solution in series operation, first through a cation exchanger in the hydrogen form, then through an anion exchanger in the sulfate form, said anion exchanger being selected from the group consisting of a strongly basic solid anion exchanger, a weakly basic solid anion exchanger, a strongly basic liquid anion exchanger, and a weakly basic liquid anion exchanger.

5. A process for removing sulfuric acid, calcium salts, and magnesium salts from a solution containing from about 1% to about 90% acetic acid and from about 0.5% to about 5% of a combination of said sulfuric acid and said salts which comprises: passing said solution in series through a cation exchanger in the hydrogen form and through an anion exchanger in the sulfate form, said anion exchanger being selected from the group consisting of a strongly basic solid anion exchanger, a weakly basic solid anion exchanger, a strongly basic liquid anion exchanger, and a weakly basic liquid anion exchanger.

6. A process for removing sulfuric acid, calcium salts, and magnesium salts from a solution containing from about 1% to about 90% acetic acid and from about 0.5% to about 5% of a combination of said sulfuric acid and said salts which comprises: passing said solution through a mixed resin bed comprising a cation exchanger in the hydrogen form and an anion exchanger in the sulfate form, said anion exchanger being selected from the group consisting of a strongly basic solid anion exchanger and a weakly basic solid anion exchanger.

7. A process as in claim 5 wherein the concentration of the acetic acid is from about 29% to about 32%.

8. A process as in claim 6 wherein the concentration of the acetic acid is from about 29% to about 32%.

9. A process as in claim 5 wherein the anion exchanger is a weak base liquid anion exchanger in the sulfate form.

10. A process as in claim 5 wherein the anion exchanger is a strong base liquid anion exchanger in the sulfate form.

11. A process as in claim 1 wherein the ratio of cation exchanger to anion exchanger is from about 0.2 to about 4.0.

12. A process for regenerating an ion exchange system containing an intimate mixture of a cation exchange resin in the hydrogen form and an anion exchange resin in the sulfate form which comprises: passing an aqueous solution containing from about 1% to about 15% $H_2SO_4$ downwardly through said bed and thereafter rinsing said bed with water until substantially no $SO_4^=$ ions are detectable in the effluent.

13. A process for regenerating an ion exchange system containing an intimate mixture of a cation exchange resin in the hydrogen form and an anion exchange resin in the sulfate form which comprises: passing an aqueous solution containing from about 2% to about 15% $H_2SO_4$ at a regenerant level of from about 0.5 to about 12.0 pounds per cubic foot of said mixed resin through said mixed resin bed, and thereafter rinsing said bed with water until substantially no $SO_4^=$ ions are detectable in the effluent.

14. A process for regenerating an ion exchange system which system consists of a cation exchange resin in the hydrogen form and a separate anion exchange resin in the sulfate form which comprises: passing an aqueous solution containing from about 2% to about 15% $H_2SO_4$ downwardly through said cation exchange resin and sequentially passing said solution through said anion exchange resin, and thereafter rinsing said anion exchange resin with water until substantially no $SO_4^=$ ions are detectable in the effluent.

15. A process for removing salts of strong acids from a solution containing from about 0.5% to about 5.0% of said salts and containing from 0.5% to 95% of a material selected from the group consisting of weak electrolytes and nonelectrolytes which comprises: passing said solution through a mixed resin bed comprised of a cation exchanger in the hydrogen form and an anion exchanger in the sulfate form, said anion exchanger being selected from the group consisting of a strongly basic solid anion exchanger and a weakly basic solid anion exchanger, said mixed resin bed being regenerated by passing an aqueous solution containing from about 1% to about 15% $H_2SO_4$ downwardly through said bed and thereafter rinsing said bed with water until substantially no $SO_4^=$ ions are detectable in the effluent.

References Cited by the Examiner

UNITED STATES PATENTS

| | | | |
|---|---|---|---|
| 2,415,558 | 2/1947 | Hesler et al. | 260—535 |
| 2,461,505 | 2/1949 | Daniel | 210—30 XR |
| 2,468,471 | 4/1949 | Thurston | 210—38 |
| 2,469,694 | 5/1949 | Lundberg | 210—37 |
| 2,615,924 | 10/1952 | Reents | 260—637 |
| 2,702,795 | 2/1955 | Gilwood | 260—2.1 |
| 2,884,384 | 4/1959 | Howell | 260—2.1 |
| 2,962,438 | 11/1960 | Smith | 210—37 |
| 3,074,820 | 1/1963 | Kunin | 210—21 |
| 3,090,707 | 5/1963 | Moebes | 210—24 XR |

OTHER REFERENCES

Nelson et al.: J.A.C.S., vol. 77, pp. 329–339 (1955).

MORRIS O. WOLK, *Primary Examiner.*

LEON ZITVER, *Examiner.*